3 Sheets—Sheet 1.

T. R. SINCLAIRE.
APPARATUS FOR FILTERING LIQUIDS.

No. 169,857. Patented Nov. 9, 1875.

Witnesses. Inventor.

3 Sheets—Sheet 2.

T. R. SINCLAIRE.
APPARATUS FOR FILTERING LIQUIDS.

No. 169,857. Patented Nov. 9, 1875.

Witnesses.
A. J. DeLacy.
T. J. Keane

Inventor.
Thos. R. Sinclaire

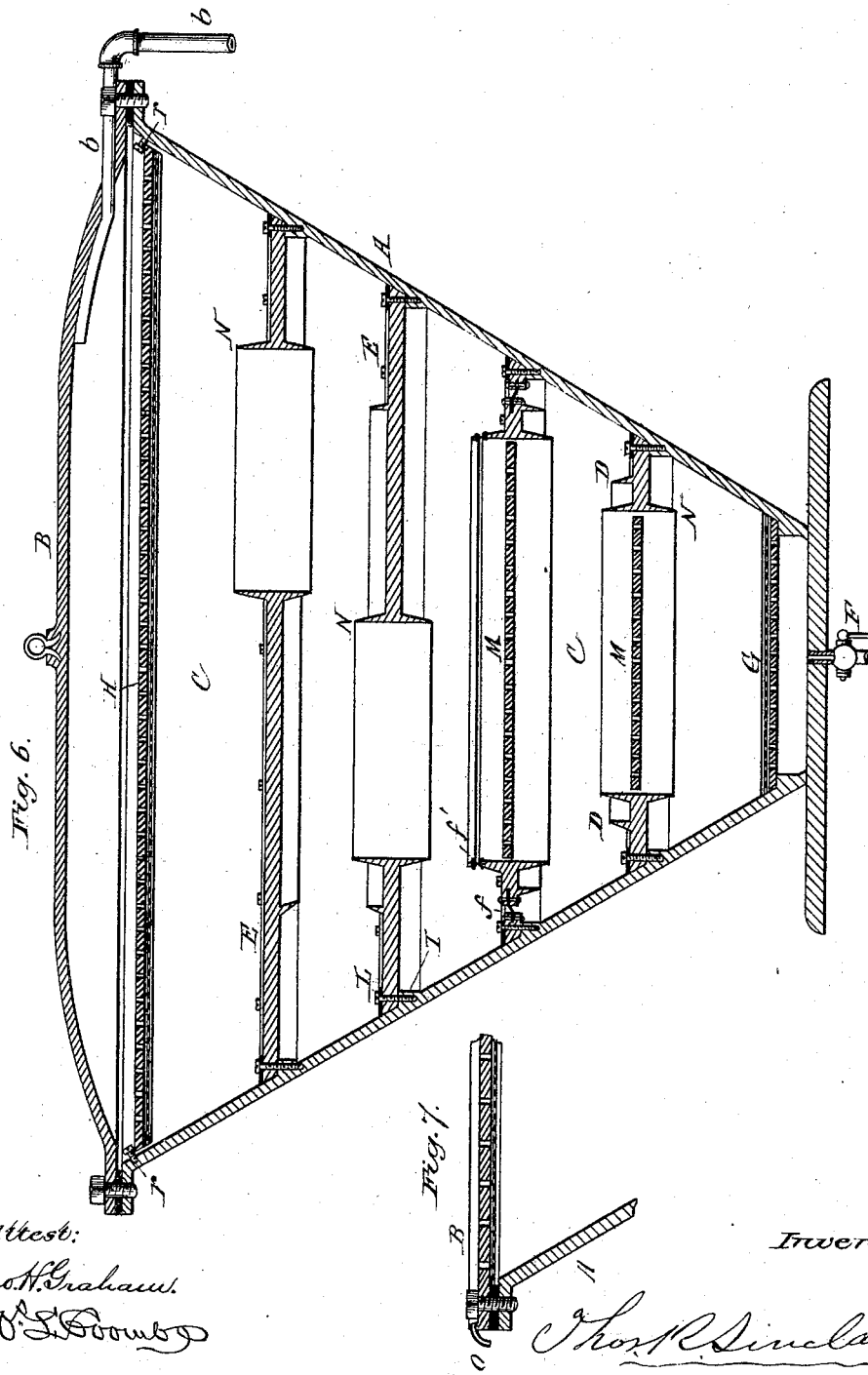
T. R. SINCLAIRE.
APPARATUS FOR FILTERING LIQUIDS.
No. 169,857.  Patented Nov. 9, 1875.

UNITED STATES PATENT OFFICE.

THOMAS R. SINCLAIRE, OF BROOKLYN, NEW YORK.

IMPROVEMENT IN APPARATUS FOR FILTERING LIQUIDS.

Specification forming part of Letters Patent No. 169,857, dated November 9, 1875; application filed August 10, 1875.

*To all whom it may concern:*

Be it known that I, THOMAS R. SINCLAIRE, of the city of Brooklyn, in the county of Kings and State of New York, have invented certain new and useful Improvements in Apparatus for Filtering Liquids; and I do hereby declare that the following is a full, clear, and exact description of the same, reference being had to the accompanying drawing, making part of this specification, in which—

Figure 1:
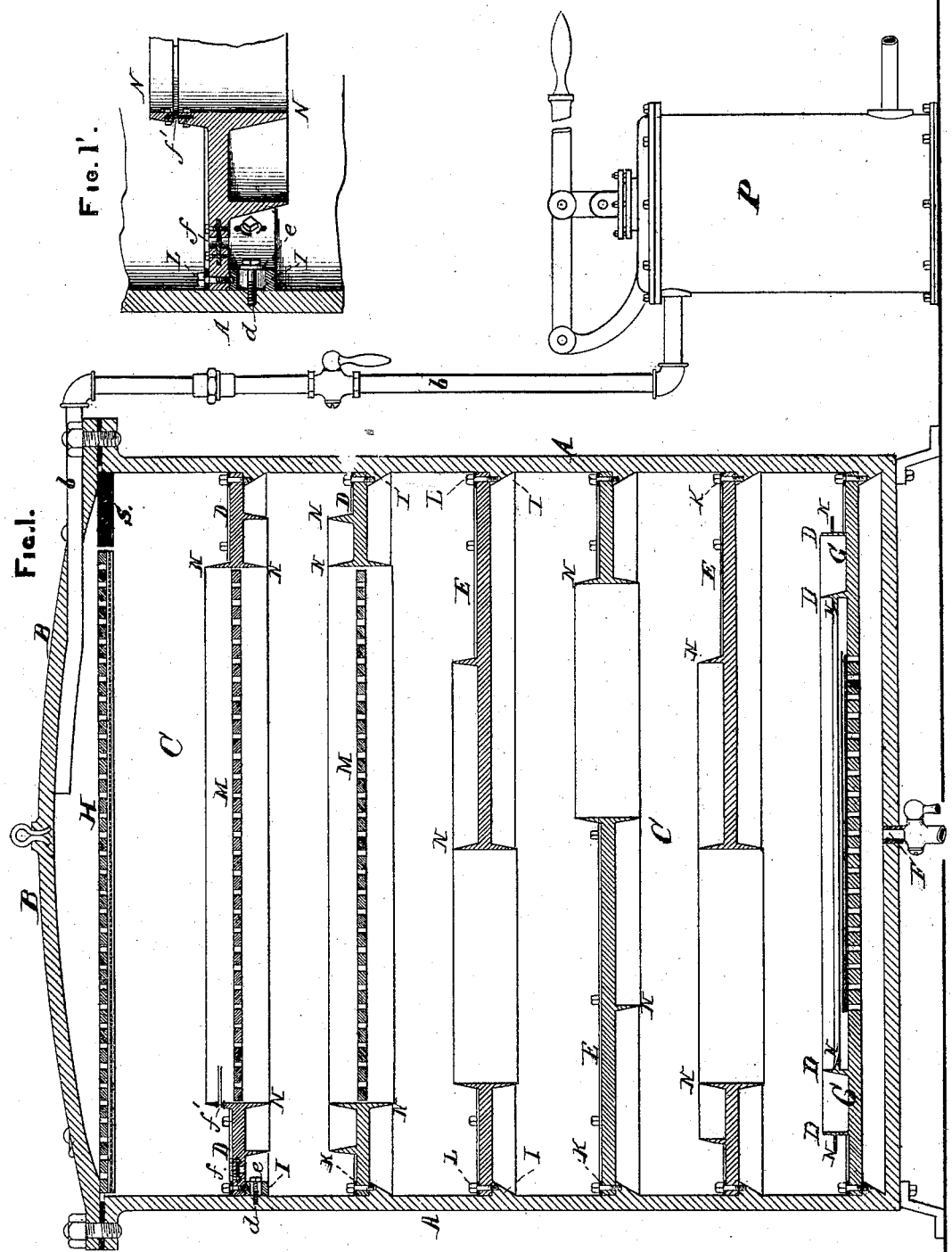
Figure 2:
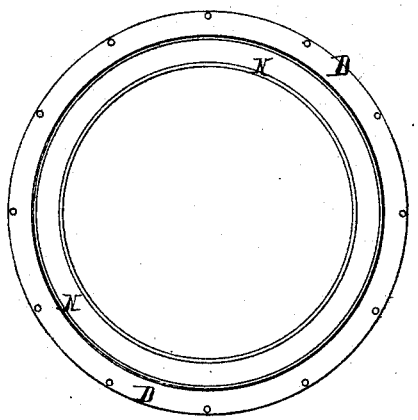
Figure 3:
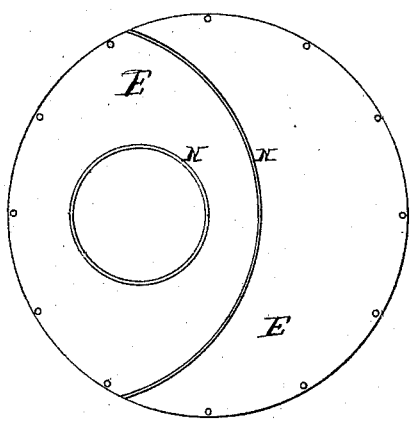
Figure 4:
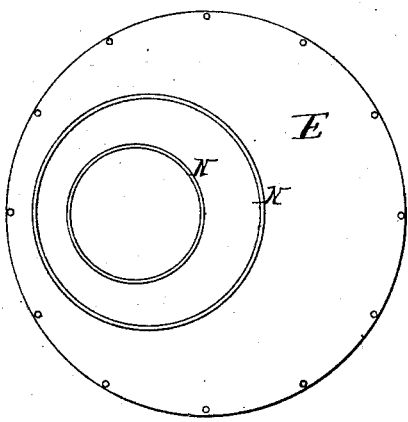
Figure 5:
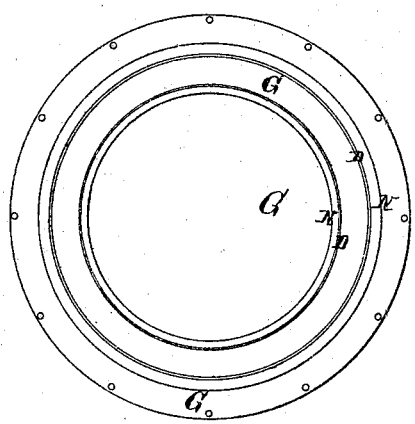

Figure 1 represents a vertical central section of a filtering-vessel having my said improvements applied thereto. Fig. 1' represents an enlarged sectional view of a portion of the vessel, ledge, counter-ledge, and rib or shoulder, the latter being shown as removable or sliding. Fig. 2 shows a plan view of one of the ledges D and N. Figs. 3 and 4 show plan views of ledges E and N. Fig. 5 shows a plan view of the diaphragm G, with its ledges. Fig. 6 represents a sectional view of my invention as applied to a conical vessel, and Fig. 7 a detached sectional view of a modification of my invention.

My present invention relates to certain improvements in the interior construction of filtering-vessels, whereby the liquid to be filtered is caused to percolate the body or mass of the filtering material, and thereby become properly filtered before reaching the place of discharge.

In the accompanying drawing, the letter A, Fig. 1, designates a filtering-vessel, which is shown as being cylindrical, but which may be of a conical or tapering or any other suitable shape. The space within this vessel, lettered C, receives the charcoal or other filtering material, and is termed the filtering-chamber. The vessel A is shown as provided with a cover, B, secured to it by an air-tight joint; and through the cover I have shown a pipe, b, for the introduction of the liquid to be filtered; and I have also shown this pipe as being connected with a force-pump, P, by means of which the liquid may be forced into and through the filtering material, though any other suitable forcing apparatus or pressure-producing medium or apparatus may be employed for that purpose. The vessel A is also shown as provided with an eduction pipe or orifice, F, which, in the example shown in the drawing, is located at the bottom of said vessel; and I have also shown the said vessel as being provided with two perforated diaphragms or plates, G and H, which are represented as being covered with wire-cloth and canvas, which wire-cloth and canvas may, if desired, be fastened or secured to the said diaphragms by some adhesive substance, or by any suitable mechanical means, the diaphragm G being placed at or near the bottom of the vessel, and the diaphragm H at or near the top.

These diaphragms G and H may be perforated over their entire surfaces, or only a part of their surfaces, as deemed expedient; or they may be impervious when provision is otherwise afforded for the passage of the liquid past them—as, for instance, by leaving an intermediate space between the edges of the said diaphragms and the vessel; or they may be impervious or made liquid-tight where they join with the vessel or ribs, when provision is made for the passage of liquid through them; and one or more of these diaphragms may be used, or they may be dispensed with altogether, as found expedient.

To the inner surfaces of the walls of the vessel A I attach ledges or deflectors D D, as many as desired, which ledges are pliable, flexible, or adjustable, in whole or in part; or, in certain instances, they may be rigid. When flexible, they, as well as the counter-ledges N, may be constructed of rubber or other suitable material.

These ledges may be annular or arc-shaped, or in detached sections, or so as to break joints with each other; or they may be arranged spirally along the walls of the vessel, and may also be arranged at any convenient angle or curve, or caused to assume the same when packing the vessel.

In the drawing I have shown the side ledges D D as being attached to the inner surfaces of the walls of the vessel through the medium of ribs or shoulders I, to which ribs or shoulders the said ledges are secured by means of bolts L, the heads of which may be provided with washers, or, preferably, an annular washer, K, extending around the vessel, and the joint between the ledges and the vessel or ribs may be made liquid-tight; but it is obvious that any of the ledges may be attached to, or formed upon, the walls of the vessel in any other suitable manner. I do not, however, limit myself to the precise construction of the ledges as described, it being obvious that they may be formed by corrugating the walls of the vessel, or by making the walls of sufficient thickness to allow V or other suitably shaped recesses to be cut or formed on the interior surfaces of said walls, the bottom of the recesses constituting the inner surface of the walls, and the projections serving the part of ledges.

The diaphragms G and H, when containing an impervious surface, may also be provided with ledges D D, as exemplified by the diaphragm G in the drawing, and a liquid-tight joint may be formed between the diaphragms and the sides of the vessels in any suitable manner.

S, Fig. 1, represents a deflecting shelf or ledge projecting from the interior of the vessel A, at or near the top of the same, and forming a liquid-tight joint with said vessel, and which ledge or shelf may be provided with ledges and counter-ledges similar to the ledges D N on the diaphragm G. The surfaces of the ledges D D are shown as provided with counter or supplementary ledges N N, and these counter or supplementary ledges N N may be movable, pliable, flexible, or adjustable, or they may be rigid, and they may be arranged at right angles to the surfaces of the ledges D D, or may be inclined or curved. One or more of these counter or supplementary ledges may be arranged upon any of the exposed surfaces of the ledges D D, as deemed expedient, and they may be continuous or arranged in detached sections, and may be of the same or of different sizes or depths.

E E represent ledges or diaphragms, provided with eccentric passages through them, so that the liquid being filtered may be caused to take an angular, serpentine, or zigzag course on its way to the place of discharge. These ledges or diaphragms E E may be movable, pliable, rigid, or flexible, and they are shown as provided with counter or supplementary ledges N, in the same manner as the ledges D D.

The object of making the ledges and counter-ledges D, E, and N pliable, flexible, or adjustable is to enable them to yield and conform to any change of position of, or in, the filtering material which is in contact with them—as, for instance, when the filtering material immediately underlying, surrounding, or in contact with a ledge, from the action of the liquid or other cause, shrinks, or is pressed away from or tends to leave the ledge, the ledge, by reason of its being pliable, flexible, or adjustable, will follow or adjust itself to, or can be adjusted to, such changed position of the filtering material, and thereby effectually prevent the formation and establishment of any gaps or open channels between the surfaces of such ledges and the filtering material.

Hence, it is obvious that the said ledges and counter-ledges, when made of rigid material, may be made self-adjusting in various ways—as, for instance, by hinges or flexible joints, as indicated at $f f'$, Figs. 1 and 1', or may be arranged to slide, in a manner instanced at $e$.

In Figs. 1 and 1' I have shown an example of the hinged joint, in which $f$ and $f'$ represent hinges or ledges D, E, and N, respectively. I have also shown an example of making the ribs I removable, as by bolt at $d$, and also a means of adjusting the said ribs or ledges, as by slot at $e$. And the purpose of the counter or supplementary ledges N N, whether yielding or rigid, is to arrest the flow of the liquid upon or along the surfaces of the ledges D D and E, and between them and the filtering material, and to deflect the liquid away from said surfaces toward and into the filtering material. This percolation of the liquid through the filtering material is still further assisted by the eccentric passages of the diaphragms or ledges E.

M M designate separating-plates for separating layers of different kinds of filtering material or different layers of the same kind. I have shown these separating-plates as arranged in the upper part of the vessel A, and as being perforated; but it is obvious that they may be placed elsewhere in the vessel, and, like the diaphragms, may be made impervious, instead of wholly or partially perforated or permeable, and of any suitable shape, form, and size, and of any suitable material.

The nature of some filtering materials—such, for instance, as charcoal—being to contract or compact away from the walls of the filtering-vessel, thereby leaving openings or channels for the passage of the liquid, it is obvious that any means for preventing the same performs an important function in filtration. By the use, therefore, of inclined, conical, or tapering walls or sides, the filtering material, either by its own weight or gravity, as well as by the addition of the pressure of the liquid upon the same, is caused to press against or become impacted against such walls of the vessel, thus preventing and obviating such passages or channels, and the greater the pressure exerted, either by the weight of the coal or pressure of the liquid, the more perfect the result; and thus it will be seen that the perfectness of such result is brought about from either or both of the two causes—viz., the degree of angle of the wall, and the amount of pressure used. But the filtering material thus compacted or wedged in between the conical or tapering walls of such vessel (and especially if such filtering material be a pulverulent and cohesive substance, like finely-ground charcoal) now offers a very much greater resistance to the passage of the liquid than it would if packed in a vessel with vertical walls; and it is for this reason that a filtering-vessel so constructed and packed with such material will not operate as successfully, or with such rapidity, as it will by the employment of some extraneous or liquid-forcing apparatus.

In Fig. 6 it will not only be seen that the filtering material will be compacted against the tapering walls of the vessel, but that the liquid will also be caused to flow away from such walls and into the said filtering material by means of the ledges D and E, and to take a sinuous, serpentine, or zigzag course by means of said ledges or diaphragms E.

In the construction of the vessel illustrated in Fig. 6, where the walls are shown as tapering or conical, it will be seen that the ribs I need not be movable, since the ledges or diaphragms can be taken out or removed without interfering with the rib next above the same.

When filtering upward the diaphragm H may be held in place by any suitable contrivance—as, for instance, by bolts $r$, as illustrated, when the cover, if necessary, may be removed, and the liquid allowed to flow away through an orifice in the wall of the vessel above the diaphragm, or over its sides into any suitable receptacle.

As illustrated in Fig. 7, the diaphragm H is removed, and the cover itself is shown perforated or permeable, with a flange surrounding the same, with an orifice or pipe, O, through the said flange, for the passage of the liquid after filtration.

In preparing for operation the filtering-vessel illustrated in the drawing, the diaphragms or ledges, which would interfere with the packing of the filtering material, can be temporarily removed, and the filtering material then packed in the vessel up to the proper point, and the said diaphragms or ledges replaced in proper order.

The vessel illustrated in the drawing having been properly packed, the liquid to be filtered is introduced in any suitable manner, preferably by means of a force-pump, P, and by the action of the ledges D, counter or supplementary ledges N, and diaphragms or ledges E, as before stated, and conical walls, when used, it will be compelled to percolate through the mass or body of the filtering material, and thereby become thoroughly filtered before reaching the place of discharge.

Although I have described the employment of separating-plates M M, it is obvious that such plates may be used or omitted, as found desirable; and although I have shown the plates M, the pliable, flexible, rigid, or adjustable ledges D D, the counter-ledges N, and the eccentric ledges E as applied to a closed or air-tight vessel, I do not wish to be understood as confining myself to the use or employment thereof in such a vessel, as it will be obvious that they may be also applied to an open vessel; and although I have shown and described the liquid to be filtered as being introduced at or near the top of the filtering-vessel, (say through the pipe or orifice $b$,) and delivered, when filtered, at or near the bottom, (say through the pipe or orifice F,) yet it is obvious that the operation may be carried on in the reverse direction—that is to say, from or near the bottom of the vessel (say through the pipe or orifice F) upward, and the liquid discharged in a filtered condition at or near the top through a pipe or otherwise; and in the latter mode of operation the cover B of the apparatus may be removed, and the diaphragm H be properly secured, or a perforated cover may be used, and diaphragm H dispensed with; and I will here remark, that in filtering in a downward direction, the solid bottom of the vessel may be perforated, and the diaphragm G omitted, and said perforated bottom may be provided with ledges D and counter-ledges N, if desired, or the solid bottom may be omitted, in which cases the liquid can escape through the diaphragm G or perforated bottom, respectively, into any suitable receptacle.

It is of course to be understood that the filtering-vessel may be provided entirely with the ledges D, as described, with or without counter-ledges N, or it may be provided entirely with the diaphragms or ledges E, with or without counter-ledges N; or it may be provided with both styles D and E, with or without counter-ledges; and it is obvious that additional supplementary or counter ledges may be arranged upon the counter-ledges N, if desired.

From the foregoing description of the operation of the filtering-vessel, as shown both in Figs. 1 and 6, it is obvious that any filtering-vessel so constructed that the liquid may be forced, under pressure, through the filtering material contained in the same, and discharged through any sized or any number of openings at the place of exit, would be, to all intents and purposes, a filtering-vessel designated by the terms "air-tight," "hermetically sealed," or "closed," or any synonymous terms. This will plainly appear by introducing the liquid through the pipe or orifice F, and discharging the same through the cover of the vessel, as indicated at Figs. 6 and 7.

What I claim as my invention, and desire to secure by Letters Patent, is—

1. The combination of adjustable, pliable, or flexible ledges D D, one or more, with the interior surfaces of a filtering chamber or vessel, substantially as described.

2. The combination of counter or supplementary ledges N N, one or more, whether the same are adjustable, pliable, flexible, or rigid, with one or more adjustable, pliable, flexible, or rigid ledges or diaphragms, substantially as described.

3. The combination of one or more diaphragms or ledges, E, having eccentric passages, with a filtering chamber or vessel, substantially as described.

4. The combination, with a filtering-vessel constructed to filter liquid under pressure, of a ledge or shelf projecting from the interior of the vessel at or near the top of the same, with or without a ledge or shelf projecting from the interior of the vessel at or near the bottom thereof.

5. The combination, in a filtering chamber or vessel, of one or more separating-plates, M, with one or more adjustable, pliable, flexible, or rigid ledges or deflectors, substantially as described.

6. The combination, with the tapering side or walls of a filtering-vessel constructed for filtering liquid under pressure, of ledges or deflectors, with or without counter-ledges, substantially as described.

7. The combination of the following elements: the filtering-vessel A B, ledges D, diaphragms or ledges E, counter or supplementary ledges N, movable plates M, diaphragms G H, pipes or orifices F $b$, and a forcing apparatus, substantially as herein shown and described.

THOS. R. SINCLAIRE. [L. S.]

Witnesses:
A. J. DE LACY,
T. J. KEANE.